United States Patent
Coyle et al.

(10) Patent No.: US 6,609,221 B1
(45) Date of Patent: Aug. 19, 2003

(54) METHOD AND APPARATUS FOR INDUCING BUS SATURATION DURING OPERATIONAL TESTING OF BUSSES USING A PATTERN GENERATOR

(75) Inventors: Joseph P. Coyle, Leominster, MA (US); Garry M. Tobin, Atkinson, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/387,320

(22) Filed: Aug. 31, 1999

(51) Int. Cl.[7] ............................................. G06F 11/00
(52) U.S. Cl. .................................... 714/715; 714/738
(58) Field of Search ................................ 714/715, 712, 714/738, 799, 43, 56

(56) References Cited

U.S. PATENT DOCUMENTS

| | | |
|---|---|---|
| 4,451,886 A | 5/1984 | Guest et al. |
| 4,691,294 A | 9/1987 | Humpleman |
| 4,716,525 A | 12/1987 | Gilanyi et al. |
| 4,797,815 A | 1/1989 | Moore |
| 4,864,496 A | 9/1989 | Triolo et al. |
| 4,881,165 A | 11/1989 | Sager et al. |
| 5,001,712 A | 3/1991 | Splett et al. |
| 5,138,257 A | 8/1992 | Katsura |
| 5,357,195 A | 10/1994 | Gasbarro et al. |
| 5,359,235 A | 10/1994 | Coyle et al. |
| 5,406,147 A | 4/1995 | Coyle et al. |
| 5,440,722 A | 8/1995 | VanderSpek et al. |
| 5,450,572 A | 9/1995 | Ruedinger et al. |
| 5,452,436 A | 9/1995 | Arai et al. |
| 5,461,330 A | 10/1995 | Gist et al. |
| 5,479,123 A | 12/1995 | Gist et al. |
| 5,499,338 A | 3/1996 | Gercekci et al. |
| 5,534,811 A | 7/1996 | Gist et al. |
| 5,574,866 A | 11/1996 | Smith et al. |
| 5,592,658 A | 1/1997 | Noam |
| 5,596,715 A | 1/1997 | Klein et al. |
| 5,600,824 A | 2/1997 | Williams et al. |
| 5,628,027 A | 5/1997 | Belmont |
| 5,634,014 A | 5/1997 | Gist et al. |
| 5,654,653 A | 8/1997 | Coyle et al. |
| 5,657,456 A | 8/1997 | Gist et al. |
| 5,687,330 A | 11/1997 | Gist et al. |
| 5,701,409 A | 12/1997 | Gates |
| 5,729,678 A | 3/1998 | Hunt et al. |
| 5,819,053 A | 10/1998 | Goodrum et al. |
| 5,844,913 A | 12/1998 | Hassoun et al. |
| 5,862,177 A * | 1/1999 | Cummings et al. ......... 375/224 |
| 5,951,705 A | 9/1999 | Arkin et al. |
| 5,978,934 A | 11/1999 | Gates |
| 5,996,034 A | 11/1999 | Carter |
| 6,049,894 A | 4/2000 | Gates |
| 6,134,621 A | 10/2000 | Kelley et al. |
| 6,163,824 A | 12/2000 | Quackenbush et al. |
| 6,182,248 B1 | 1/2001 | Armstrong et al. |
| 6,292,911 B1 * | 9/2001 | Swanson ..................... 714/715 |
| 6,385,738 B1 * | 5/2002 | Lo .............................. 714/725 |

* cited by examiner

*Primary Examiner*—Phung M. Chung
(74) *Attorney, Agent, or Firm*—Kudirka & Jobse, LLP

(57) ABSTRACT

Bus testing logic is built into some of the devices connected to the bus to enable these devices to perform diagnostic testing of the bus. Under control of the test logic, the devices drive the bus with output voltages corresponding to a predetermined test bit pattern that is selected to cause the bus to reach a target bus utilization level. The bus signals produced by the devices propagate along the bus and are received by other devices. The received bus signals are resolved into a received bit pattern. The received bit pattern is compared with the test bit pattern used to generate the bus signals in order to detect discrepancies. In one embodiment, the devices can operate in a first mode by driving the bus in accordance with performing normal functions or in a second mode by performing diagnostic testing on the bus by driving the bus in accordance with the test bit pattern. Test patterns can be interleaved with normal bus signals. Alternatively, the test logic in the devices can arbitrate with the normal circuitry to assume control of the bus for testing purposes. In still another embodiment, a first device includes both a bus driver and a bus receiver and a second device includes logic for looping the bus signals back to the device that generated the signals.

32 Claims, 10 Drawing Sheets

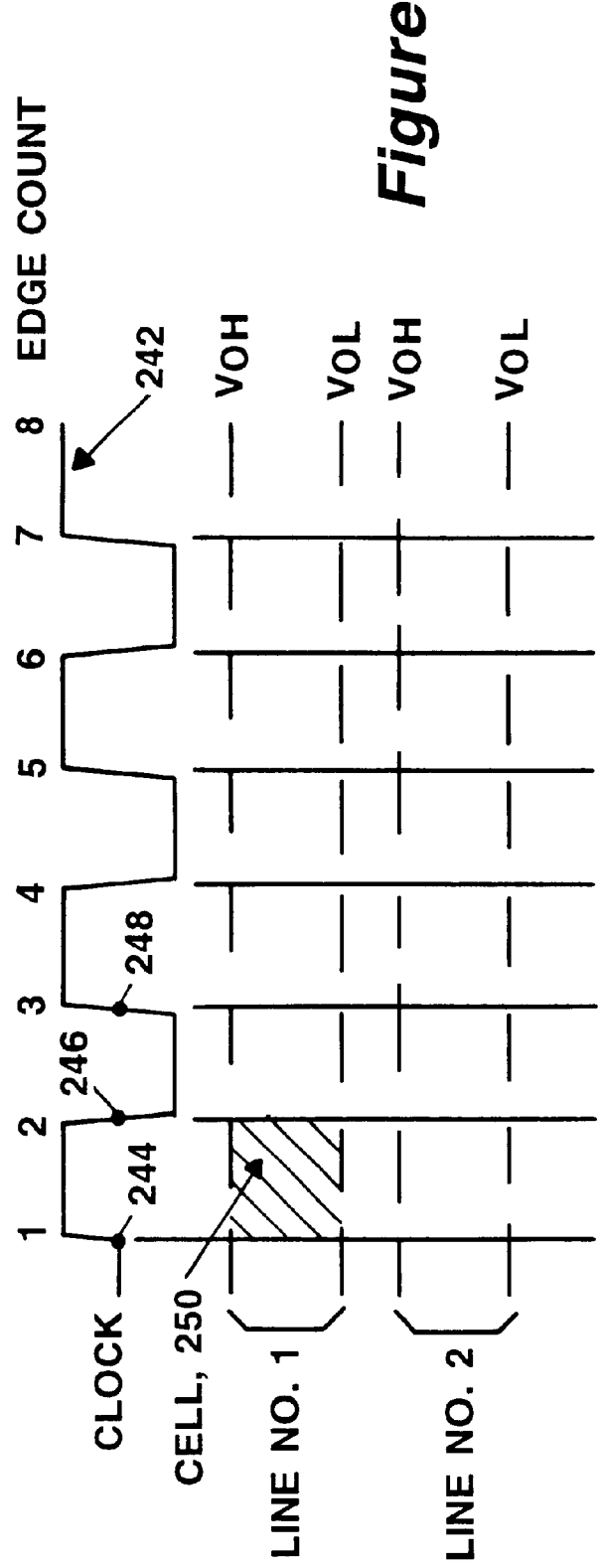

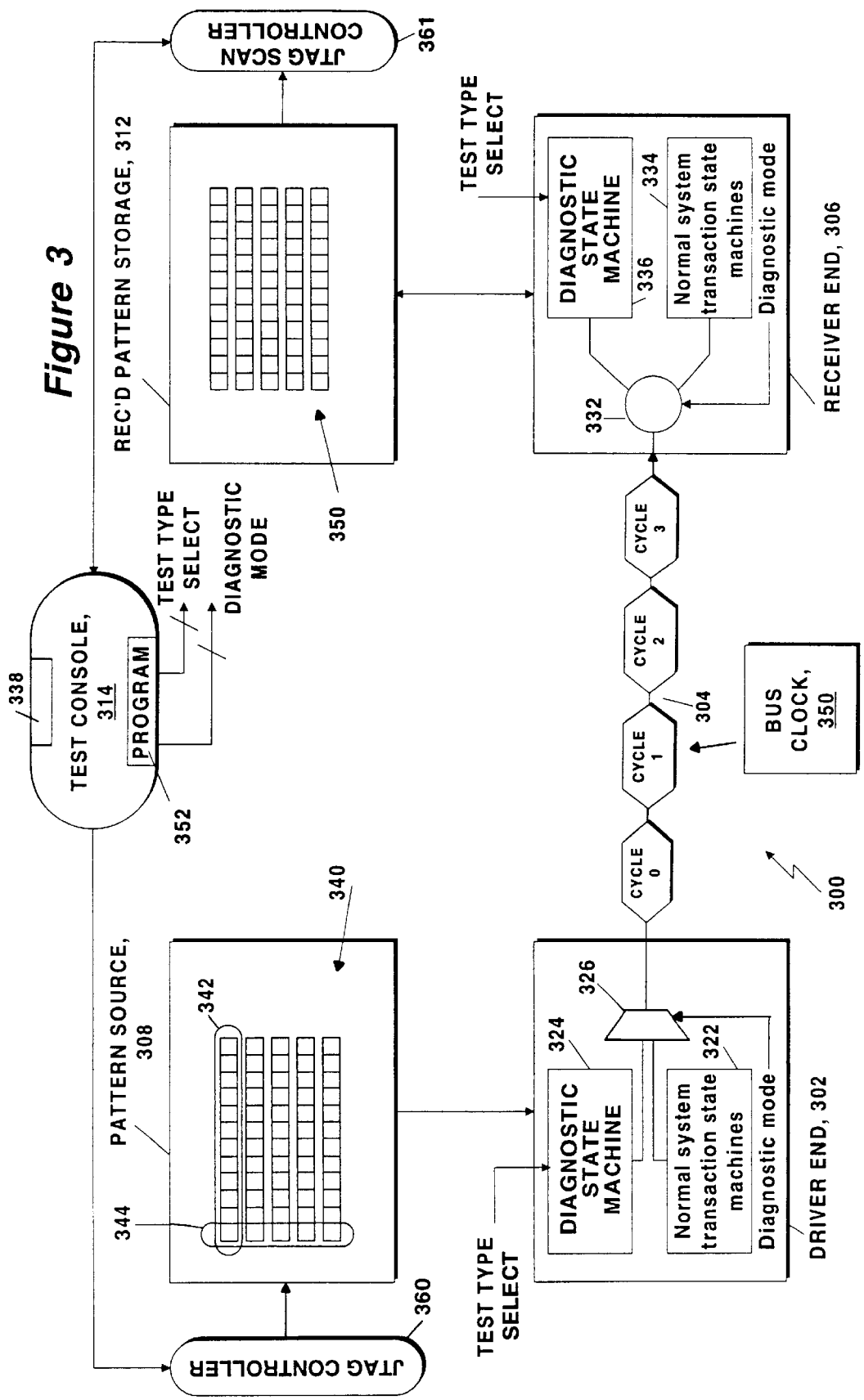

METHOD AND APPARATUS FOR INDUCING BUS SATURATION DURING OPERATIONAL TESTING OF BUSSES USING A PATTERN GENERATOR

RELATED APPLICATIONS

The present patent application is related to the following co-pending, commonly-assigned U.S. patent applications, which are incorporated by reference herein in their entirety:

1) Ser. No. 09/387,660, now U.S. Pat. No. 6,546,507 entitled "Method And Apparatus For Operational Envelope Testing of Busses to Identify HALT Limits", filed on even date herewith by Joseph P. Coyle and Garry M. Tobin.
2) Ser. No. 09/386,564, now U.S. Pat. No. 6,502,212 entitled "Method and Apparatus for Bus Parameter Optimization Using Probes of System Configurations", filed on even date herewith by Joseph P. Coyle and Garry M. Tobin.
3) Ser. No. 09/386,563, now U.S. Pat. No. 6,275,077 entitled "Method and Apparatus for Programmable Adjustment of Bus Driver Propagation Times" filed on even date herewith by Garry M. Tobin and Joseph P. Coyle now U.S. Pat. No. 6,275,077 B1.
4) Ser. No. 09/386,809, now abandonded entitled "Method and Apparatus for Programmable Adjustment of Bus Termination Resistance" filed on even date herewith by Garry M. Tobin and Joseph P. Coyle.
5) Ser. No. 09/386,553, now U.S. Pat. No. 6,499,113 entitled "Method and Apparatus for Extracting First Failure and Attendant Operating Information from Computer System Device" filed on even date herewith by Garry M. Tobin and Joseph P. Coyle.
6) Ser. No. 09/387,120, now U.S. Pat. No. 6,535,945 entitled "Method and Apparatus for Programmable Adjustment of Computer System Bus Parameters" filed on even date herewith by Garry M. Tobin and Joseph P. Coyle.
7) Ser. No. 09/386,985, now U.S. Pat. No. 6,473,871 entitled "Method and Apparatus for HASS Testing of Busses Under Programmable Control" filed on even date herewith by Joseph P. Coyle and Garry M. Tobin.

FIELD OF THE INVENTION

This invention relates generally to computer systems, and more particularly to identifying, capturing, isolating and diagnosing errors in computer system operation.

BACKGROUND OF THE INVENTION

As is known in the art, bus adapters and other devices are connected to a bus through bus interfaces and occupy physical bus locations for device interconnection called "bus slots". A bus interface is typically designed for a particular type of bus, and is responsible for complying with the signaling requirements of the bus, sometimes called its "bus protocol". The bus protocol includes the bus' electrical, physical and logical characteristics for reliable bus transfers. The bus interface generally includes bus drivers and bus receivers to send and receive, respectively, signals over the bus in accordance with the bus protocol. Essentially, each device connected to the bus has a separate instance of a bus interface for each line of the bus, each including a driver for driving that line and a receiver for sensing voltages on that line and resolving them into logic states. Bus protocols are typically specified by manufacturers and often by standards-making organizations. Bus adapters include bus interfaces for each of the buses to which they are connected.

For operation of the bus, certain of the devices can initiate requests to gain control of the bus to perform, for example, a memory access such as a "read" or "write" operation. Such operations require the requesting device (e.g., a central processing unit (CPU) and the responding device (e.g., a memory) to exchange a number of bus signals. Initially, the requesting device needs to acquire control of the bus. This can be effected, e.g., through arbitration, which generally requires the exchange of arbitration and other handshaking signals over the bus with other bus devices such as a bus arbiter and/or other potential requesting devices. Then, after eventually gaining control, the requesting device needs to assert the appropriate command line, e.g., the read line or the write line, to designate the type of operation. Additionally, for memory operations, the requesting device needs to place address information on address lines of the bus to identify the memory addresses to be accessed. Finally, the responding device needs to respond to the command, e.g., the memory needs to place data onto the bus from the addressed locations, or receive data from the bus and store them at the addressed locations.

For purposes hereof, a "bus transaction" can be defined as the set of all bus signals (e.g., handshaking, command, address and data) asserted after the requesting device has gained control of the bus, which are used to complete a logical task, such as a "read" or "write" operation, performed over the bus. Devices connected to the bus transmit the signals of a bus transaction in synchrony with the bus' clock. A "bus cycle" refers to the number of bus clock cycles required to perform a bus transaction. During a bus cycle, the requesting device asserts certain bus lines in accordance with the bus protocol, and the responding device scans certain bus lines to ascertain the information contained in handshaking, command, address, and data signals also in accordance with the bus protocol.

To assert a bus line, a bus device drives the bus line to a high voltage level or a low voltage level during each of one or more clock ticks during a bus cycle. The high voltage and low voltage levels correspond to digital LOGIC HIGH and LOGIC LOW states. To scan a bus line, a bus device typically detects the voltage on the line at a particular time, e.g., at a rising or falling edge of the bus clock, and determines whether the detected voltage is at a high or low level. The voltage level on certain lines determines, for example, whether the transaction is a read or a write, and, on other lines, whether the data includes a LOGIC HIGH or LOGIC LOW during the corresponding tick of the bus clock. Many bus lines are only driven for a portion (often only a small portion) of the bus cycle of a bus transaction.

Computer system architecture has advanced dramatically in performance and complexity. In terms of performance, computer systems can achieve higher clock speeds with increased bus widths and lower bus operating voltages. Increased bus clock speeds, measured usually in megaHertz (MHz) can allow data to be transferred faster over the computer system's bus, thereby allowing computer applications to run faster. The size of a bus, known as its width, corresponds generally to the number of data lines in the bus and determines how much data can be transmitted in parallel at the same time; thus, wider buses typically transfer data faster. Lower bus operating voltages can advantageously also reduce power consumption, which is important, for example, in miniaturization of integrated circuits and in mobile computing for extending battery operating times.

Unfortunately, lower operating voltages can make bus signals more susceptible to signaling errors due to lower signal-to-noise ratios and to signal distortion. Such noise and signal distortion can make it difficult for bus receivers to differentiate correctly, e.g., between data logic states, thus potentially yielding erroneous data.

Transient and other non-predictable errors in the received bus signals can also arise from other causes as well, and often have deleterious impacts on computer system performance. Such errors can arise, for example, from degradation over time of bus drivers and receivers in bus interfaces. Bus errors can also arise due to non-compatibility of add-on components such as adapter cards that are integrated into the computer system after installation at a customer site, and connected to one of the computer's buses, e.g., through "plug and play" operation. Where such adapter cards malfunction or simply exhibit operating parameters unanticipated by the original computer manufacturer, transfer errors can arise on the bus to which they are connected. Such bus errors can result in lost or corrupted data or hanging of the bus protocol so as to prevent completion of a bus transaction. In extreme cases, bus errors can cause system crashes.

For diagnosing bus error conditions, it is often necessary to reproduce the errors. For example, when an error occurs during normal transfers over a system bus of a computer system, it may be necessary to drive the system bus with the same set of stimuli under the same conditions as when the error occurred in order to determine its causes. It may prove difficult to apply such stimuli and reproduce the error conditions under control of the computer's operating system due to the complexities involved.

It would be desirable to provide a technique for testing bus operation to determine whether the bus is likely to perform adequately during actual operating conditions, and to assess the likelihood of bus transfer errors. Such testing should preferably lend itself for use in design verification and quality assurance prior to shipment from a system manufacturer, as well as in field servicing to assure bus operation has not degraded after installation at a customer's facility. It would also be desirable to be able to run such testing in electronic devices using designed-in testing features rather external testing apparatus that may affect testing results and are cumbersome, time-consuming and costly to use.

SUMMARY OF THE INVENTION

The invention resides in a computer system or other electronic apparatus in which bus testing logic is built into some of the devices connected to the bus to enable these devices to perform diagnostic testing of the bus. Under control of the test logic, the devices drive the bus with output voltages corresponding to a predetermined test bit pattern. Preferably the test bit pattern is selected to cause the bus to reach a target bus utilization or saturation level. The test bit pattern can include a plurality of digital values corresponding to drive voltages for the bus for testing that target bus utilization level over a bus cycle of a bus transaction. The bus signals produced by the devices propagate along the bus and are received by other devices. The received bus signals are resolved into a received bit pattern. The received bit pattern can be compared with the test bit pattern used to generate the bus signals in order to detect discrepancies, or a first failure resulting from the test can be captured, as described in the above-referenced patent application entitled "Method and Apparatus for Extracting First Failure and Attendant Operating Information From Computer System Devices".

In one embodiment, the devices can operate in a first mode by driving the bus while performing normal operating functions of the device or in a second mode while performing diagnostic testing on the bus by driving the bus in accordance with the test bit patterns. Test patterns can be interleaved with normal bus signals. Alternatively, the test logic in the devices can arbitrate with the normal circuitry to assume control of the bus for testing purposes. Preferably, the same bus drivers and receivers which are used for normal device operation are used for bus testing. Alternatively, dedicated bus drivers and receivers can be used.

In accordance with another embodiment, the received bit pattern is stored in the devices and JTAG technology is used to provide the test bit pattern to the devices and to scan out the received bit pattern. Internal diagnostic logic, or an external test console or service processor can then perform the analysis of the bit patterns.

In still another embodiment, the bus driver which generates the testing bus signals is located in a different device from the bus receiver which detects the testing bus signals. In yet another embodiment, a first device includes both a bus driver and a bus receiver and a second device includes logic for looping the bus signals back to the device that generated the signals. In this manner, a comparison of the bus signals can be performed in a single device.

The invention permits system stress testing without the need of instruction stream generated bus cycles. The testing can be performed, for example, for purposes of design verification, diagnostic testing after an error has been encountered, or on a regular basis, e.g., as part of power on self-test (POST) procedures. The invention permits deterministic saturations of the bus when and where desired, e.g., for inducing various forms of error conditions, such as system-level bottlenecks and latencies, in a reproducible manner. The invention can also be used to associate a "victim" bit on a bus with its "aggressor" bit, and thus trace causes of bus error conditions.

BRIEF DESCRIPTION OF THE DRAWINGS

The above and further advantages of the invention may be better understood by referring to the following description in conjunction with the accompanying drawings in which:

FIG. 2C shows a number of waveforms useful in conveying an understanding of the voltage sequence pattern as just described in conjunction with FIGS. 2A and 2B.

FIG. 3 is a block diagram of an exemplary embodiment for implementing the unidirectional testing methodology of FIG. 2A;

DETAILED DESCRIPTION OF THE PREFERRED EMBODIMENT

A) Electronic System

Figure 1:
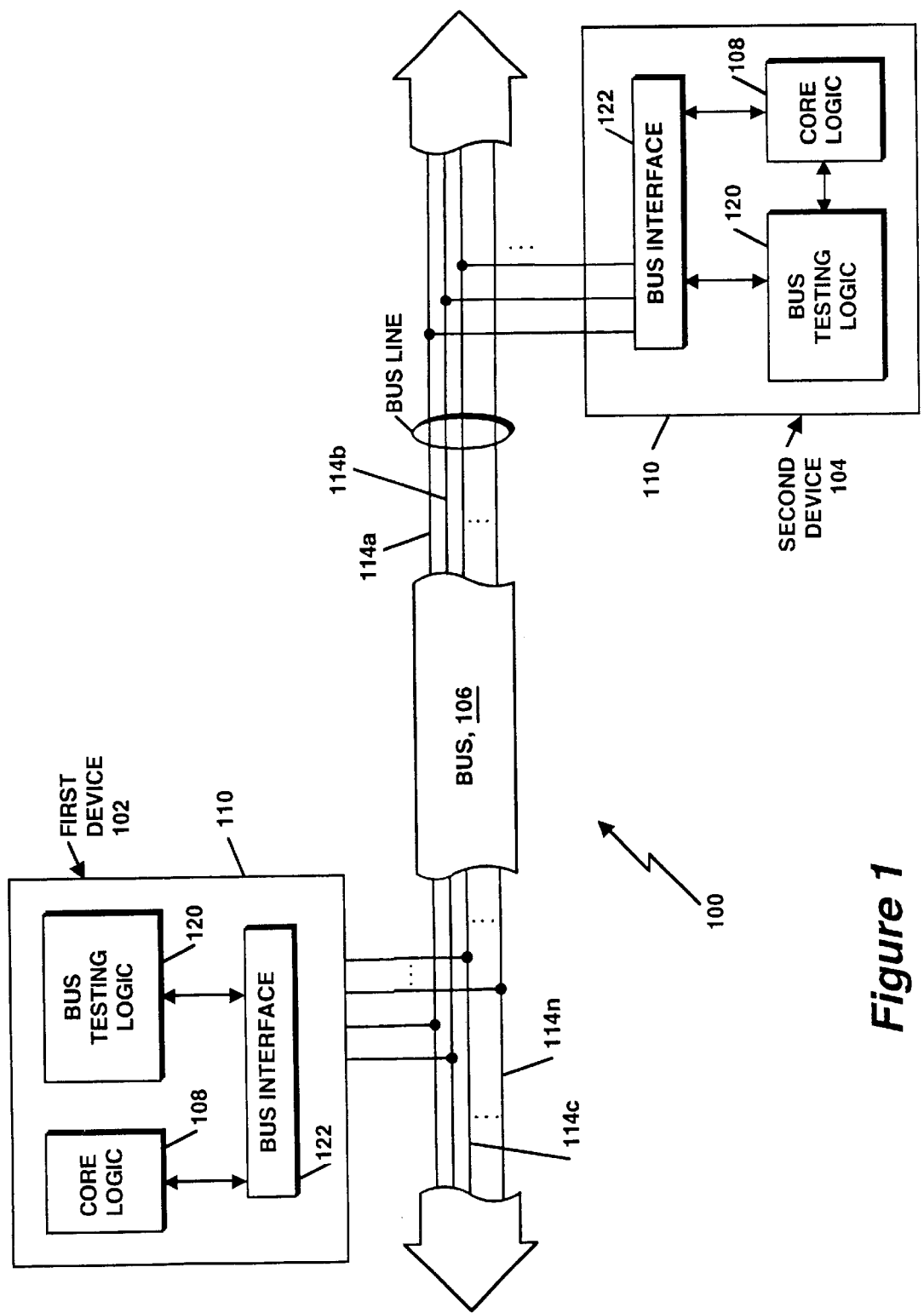
FIG. 1 is a block diagram of an electronic system having first and second functional devices interconnected by a bus and bus testing logic in accordance with an embodiment of the invention.

FIG. 1 shows an electronic system 100 having first and second devices 102, 104 interconnected for communication therebetween by a bus 106. While only two such devices are shown for illustrative purposes, the invention can be implemented with any practical number of such devices. The electronic system 100 can be, for example, a computer system, such as, e.g., a workstation, server, or personal computer. The electronic system 100 can also be, for example, a communication device such as a cellular phone, or even, foreseeably, a video game console, entertainment system, or other electronic apparatus or instrument having a processor (such as a microprocessor or digital signal processor) or controller. Alternatively, the electronic system 100 can comprise a network of computer systems or other network-capable electronic apparatus or instruments, which are interconnected by a communication channel, which will be referred to herein as a bus.

For ease of explanation, the devices 102, 104 are shown as containing the same components. Each device 102, 104 has conventional core logic 108 for performing the respective device's intended functions. For example, where the electronic system 100 is a computer system, the devices 102, 104 can be, e.g., a CPU and a memory module, and the core logic 108 of each can be responsible, respectively, for processing and storing computer program instructions and data. Each device 102, 104 also includes novel, bus testing logic 120 for testing the bus 106, as described in detail, by injecting a predetermined sequence of voltage levels, high or low, so that they can be analyzed after traversing the bus. The bus testing logic 102 can be implemented in software, firmware, hardware, or a combination, depending on the application, and is preferably implemented on the same printed circuit board or application specific integrated circuit (ASIC) as the rest of the device. A bus interface 122 connects the core logic 108 and bus testing logic 120 to the bus 106, and is responsible for driving the bus 106 or receiving signals from the bus 106. Thus, for example, in order for the first device 102 to send a message to the second device 104, the core logic 108 of the first device 102 provides address, data and control information to the bus interface 122 of the first device 102, which converts the information into bus signals that, after gaining control of the bus 106, it sends over the bus to the second device 104. The bus signals must comply with the bus protocol specified for bus 106, including its electrical, physical, and logical requirements.

Figure 2A:
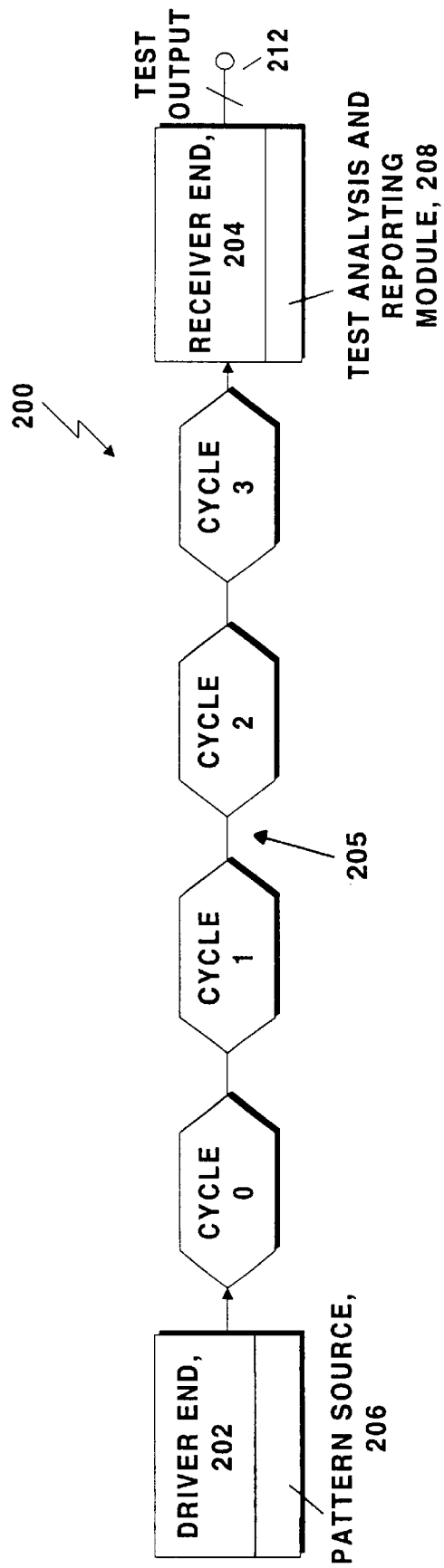
FIGS. 2A and 2B are illustrations of a unidirectional and a loopback testing methodology, respectively, which can be implemented by the electronic system of FIG. 1.
Figure 2B:
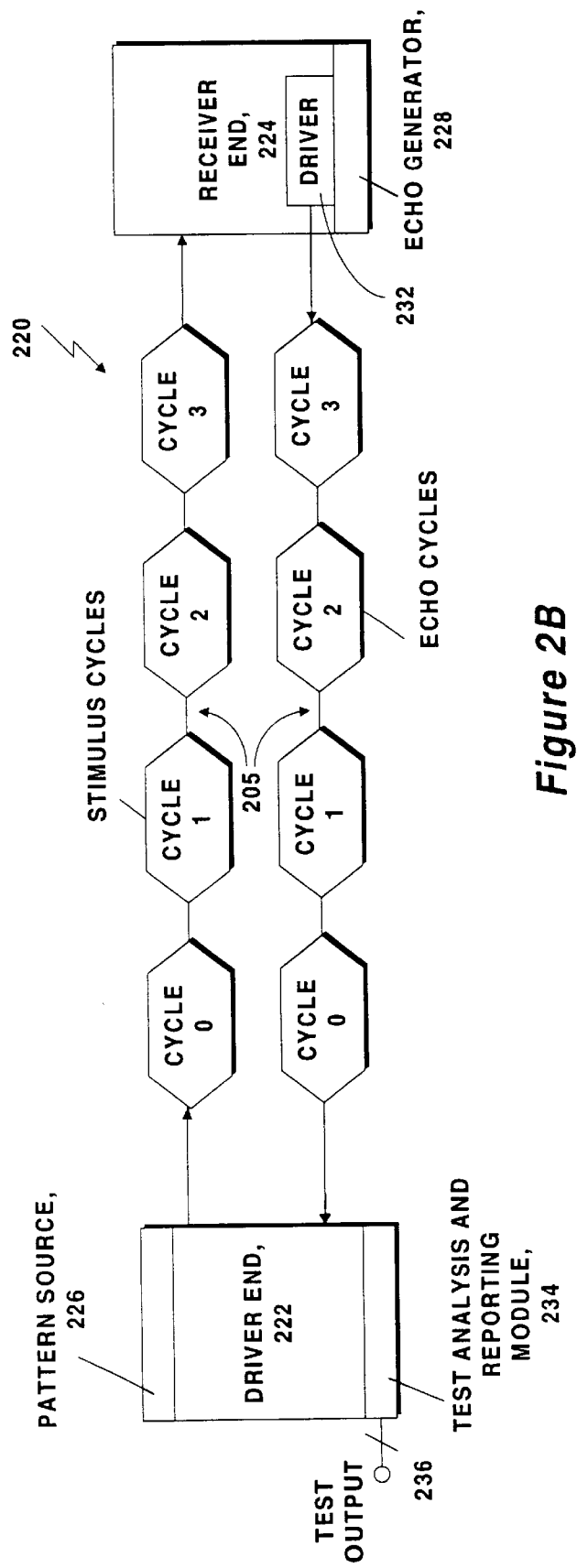

FIG. 2A and FIG. 2B show alternative methodologies for testing the bus 106. In FIG. 2A, a unidirectional testing methodology 200 is illustrated, in which a driver end 202, e.g., at first device 102 of FIG. 1, sends a predetermined sequence of bus testing voltages over the bus 205 to a receiver end 204, e.g., at the second device 104 of FIG. 1. The voltage level sequence is sent over the bus during a number of bus cycles, denoted Cycle 0, Cycle 1, etc. as stimulus cycles; hence the test entails "cycle injection." A pattern source 206 in the driver end 202 provides the voltage level sequence, called a "pattern", and a test analysis and reporting module 208, e.g., in the receiver end 204 analyzes the received bus signals and reports the results over test output link 212. Alternatively, as noted below, the receiver end 204 can forward the received stimulus cycles, e.g., over link 212, to an external processor for analysis of any errors that may have arisen during transmission and reception.

In FIG. 2B, a loopback testing methodology 220 is illustrated, in which (a) a driver end 222, e.g., at first device 102 of FIG. 1, sends a predetermined bus testing voltage pattern over the bus 205 to a receiver end 224, e.g., at second device 104 of FIG. 1, and (b) the receiver end 224 stores the received pattern and, after gaining control of the bus 205, forwards it back to the driver end 222. Accordingly, the pattern traverses the bus 205 twice, once in a forward direction and once, during loopback, in the reverse direction. Note that, for illustration purposes, the bus 205 is shown for the forward pattern signal and, separately, the reverse pattern signal. In loopback testing, a pattern source 226 in the driver end 202 provides the voltage level pattern for driving the bus, called the stimulus cycles. An echo generator 228 in the receiver end 224 responds to the stimulus cycles by generating a replica version of the received stimulus cycles, called echo cycles or simply "echo", which, after gaining bus control, a driver 232 at the receiver end 224 are sent over the bus 205. A test analysis and reporting module 234, this time located in the driver end 222, can analyze the echo cycles for any errors that may have arisen during transmission and reception of the stimulus cycles, and transmission and reception of the echo signals, and report the results over output link 236. Alternatively, the driver end 222 can forward the received echo signals, e.g., over link 212, to an external processor for analysis.

FIG. 2C shows a number of waveforms useful in conveying an understanding of the voltage sequence pattern as just described in conjunction with FIGS. 2A and 2B. The top waveform in FIG. 2C is a CLOCK 242, which is characterized by a frequency, i.e., a number of clock cycles over a period of time (Hertz). A clock cycle includes an upward or positive tick, as noted between points 244 and 246 of the waveform 242, and an adjacent downward or negative tick, as noted between points 246 and 248. The clock is used to synchronize signals on the various bus lines, of which Line No. 1 and No. 2 are depicted. Line Nos. 1 and 2 are representative of the control, address, and data lines of the bus. Theoretically, each line can be driven during each tick to either a high voltage level VOH or to a low voltage level VOL, e.g., to represent different logic states, with VOH and VOL representing voltage limits for the driver output. Accordingly, as illustrated, VOH, VOL and the boundaries of each tick form a rectangularly-shaped cell, as shown at 250, with a different cell formed at each tick at each line.

In practice, the bus protocol will generally specify that certain bus lines are only asserted during certain times and for certain durations, and commencing only at certain leading or trailing edges of a tick. (An edge count is noted at the top of FIG. 2C.) Moreover, the bus protocol may also specify the maximum number of clock cycles in a bus transaction. For example, a bus transaction can consist of nine clock cycles, and thus 18 cells on each line. Some bus protocols also specify a dead time between bus cycles, during which the bus lines normally used during a bus transaction may not be asserted. Thus, the bus is normally used for signaling during bus transactions for only a portion of the time. In other words, the bus lines No. 1 and No. 2 are normally asserted (either HIGH or LOW) during only a portion of the total number of bus cells, e.g., less than the 18 cell total.

Bus line utilization or bus saturation, as it is often called, is usually expressed as a percentage. For example, one hundred percent (100%) utilization of a bus line occurs when the bus line is asserted, e.g., during all cells of a transaction (e.g., 18 cells), fifty percent (50%) utilization occurs when the bus line is asserted during half the cells of a transaction (9 cells in the example), etc. This should be contrasted with use of the term bus saturation in another sense, in which it means 100% of available bus bandwidth (bus cycles) being utilized, with or without taking into account constraints on bus bandwidth imposed by the bus protocol. Accordingly, three different definitions of bus saturation percentage emerge, which can apply in various applications of the invention:

(1) the ratio of the number of cells used to the number of cells occurring during test duration, times 100%;
(2) the ratio of the number of bus cycles used to the number of bus cycles available, times 100%;
(3) the ratio of the number of bus cycles used to the number of bus cycles available under bus protocol, times 100%.

During testing, the invention can apply various pre-selected stimuli patterns to the bus, and can increase the frequency of their application so as to increase bus saturation percentages. At each pattern application and/or saturation level, the test apparatus can seek to identify the occurrence of any errors induced by the test signals.

FIG. 3 shows an exemplary embodiment of a testing apparatus 300 in an arrangement suitable for performing unidirectional testing. The testing apparatus 300 has a driver end 302 for applying signals to a bus 304, a receiver end 306 for receiving signals from the bus 304, a pattern source 308 for providing a pattern of voltages to the driver end 302 for use in testing the bus 304, a pattern storage module 312 for storing a received pattern after it has traversed the bus 304, and a test console 314 for controlling the diagnostic testing, e.g., responsive to input from a test technician.

The driver end 302 has a normal system transaction state machine 322 for generating a bus transaction as a result of the "normal" functions (i.e., not diagnostic test related, as described herein) of a device connected to the bus 304, e.g., the first device 102 of FIG. 1. The driver end 302 also has a diagnostic state machine 324 for self-transactions, i.e., for generating transactions specifically for use in testing. The term "self-transactions" imports that the transactions generated by the diagnostic state machine 324 will be transactions between one and the same device, e.g., the first device 102 or second device 104 of FIG. 1, for loopback testing.

During operation, the state machines 322, 324 of the driver end 302 apply their output signals intended for bus 304 to input terminals of a multiplexer 326. A multiplexer 326 is responsive to a diagnostic mode signal for passing to an output terminal thereof either the signals from the normal system transaction state machines 322 or from the diagnostic state machine 324. The driver end 302 drives the bus 304 at voltage levels corresponding to the signals passed by the multiplexer 326. At receiver end 306, received bus signals are applied to a switch 332, which is responsive to the diagnostic mode signal for passing the received bus signals either to normal system transaction state machines 334 or to a diagnostic state machine 336.

Accordingly, for normal operation of the device, the normal system transaction state machines 322, 334 can send and receive signals over the bus 304; however, for purposes of testing, the diagnostic state machines 324, 336 will instead be able to send and receive signals over the bus 304. To that end, the diagnostic mode signal, which controls the multiplexer 314 and switch 318, has a first value indicative of normal system transactions and a second value indicative of diagnostic transactions. The test console 314 can apply the diagnostic mode signals to the multiplexer 326 and switch 332 to start or terminate testing of the bus. The test console 314 can initiate bus testing, for example, as part of a start-up routine for the device, for example, during boot up, where the device is a computer system. Alternatively, a test console 314 can initiate bus testing, for example, by receiving suitable instructions from a technician, preferably using a graphical user interface (GUI) 338 provided by the test console 314. Moreover, the test console 314 can control whether the diagnostic test utilizes a unidirectional methodology or a loopback methodology by applying a test-type select signal to the diagnostic state machines 324, 336. The test-type select signal preferably has a first value indicative of a unidirectional methodology and a second value indicative of a loopback methodology, and the diagnostic state machines 324, 336 perform the tests accordingly.

As noted above, the pattern source 308 provides a pattern 340 of test voltages for used by the diagnostic state machine 324. The pattern 340 can be stored as digital values, either ONEs or ZEROs, for each bus line, indicating whether the corresponding bus line should be driven with, e.g., a corresponding high or low voltage level. Moreover, the pattern 340 can be stored in a memory as an array, in which each row of values can be applied to a different one of the bus lines, and each value (represented in the figure as a block) of a row can be applied to the corresponding bus line during one of the sequential cells of the bus cycle. Thus, for example, the values in the top row 342 could be applied to bus line No.1 of FIG. 2C during sequential cells, and the values in the far-left column 344 could be applied to the various lines of the bus 304 (including, e.g., lines Nos. 1 and 2 of FIG. 2C) during cells corresponding to the same, last tick of the bus clock 350 of the bus cycle of the test transaction.

For purposes of testing, the sequential values in the pattern 340 for each bus line can be selected to stress the bus and test accurate reception in a variety of ways. For example, each bus line can be tested to various percent levels of utilization, for example, at 25 percent, 50 percent, 75 percent, and 100 percent utilization. Moreover, the successive cells for each bus line can have alternately high and low values to maximize voltage swings during a bus cycle, and thereby to maximize the effects that signal distortion (relative to the idealized waveform) may have on accurate reception. Alternatively, each bus line can be tested with a string of constant high or constant low values so as to assess the effects of cumulative DC-offset on accurate reception.

The pattern 340 is generated by the test console 314 and stored in the pattern source 308, for example, using a JTAG controller 360 or other programmable technique to load the values into the pattern source 308. The JTAG controller 360 preferably complies with the "JTAG Specification, as set forth in IEEE 1149.1—1990, Standard Test Access Port and Boundary-Scan Architecture ("JTAG Spec"), which is incorporated herein by reference, and available from IEEE, 3 Park Avenue, 17$^{th}$ Floor, NY, N.Y., 10016-5997, USA.

As noted above, the received pattern storage 312 holds a pattern 350 of test voltages after being transmitted over the bus 304. The pattern 350 should thus correspond to the source pattern 340 as provided for transmission by the pattern source 308, with any differences between the two patterns 340, 350 being errors. Accordingly, a simple way to analyze the results of the diagnostic testing would be to compare the source pattern 340 with the received pattern 350 on a cell-by-cell or bit-by-bit basis, and indicate the lines and cells in which errors occurred. For these purposes, the diagnostic state machine 336 can store the received pattern 350 in the received pattern storage 312, which is then scanned out by a scan controller 360 and passed to the test console 314 for analysis. The scan controller 360 and the scanning of the pattern from the received pattern storage 350 can comply with JTAG Spec.

The test console 314 can be implemented in a computer system, which preferably stores and executes a computer executable program 352, e.g., software, for generating the pattern 340, loading the pattern into the pattern source 308, analyzing the pattern 350, and reporting out the results. The program 352 can also set the test-type signal and the diagnostic mode signal. In other, alternative embodiments, the diagnostic state machines 324, 336 can be responsible for generating and analyzing patterns themselves, without the need for external analyzers and can report out, e.g., only error information.

Figure 4A:
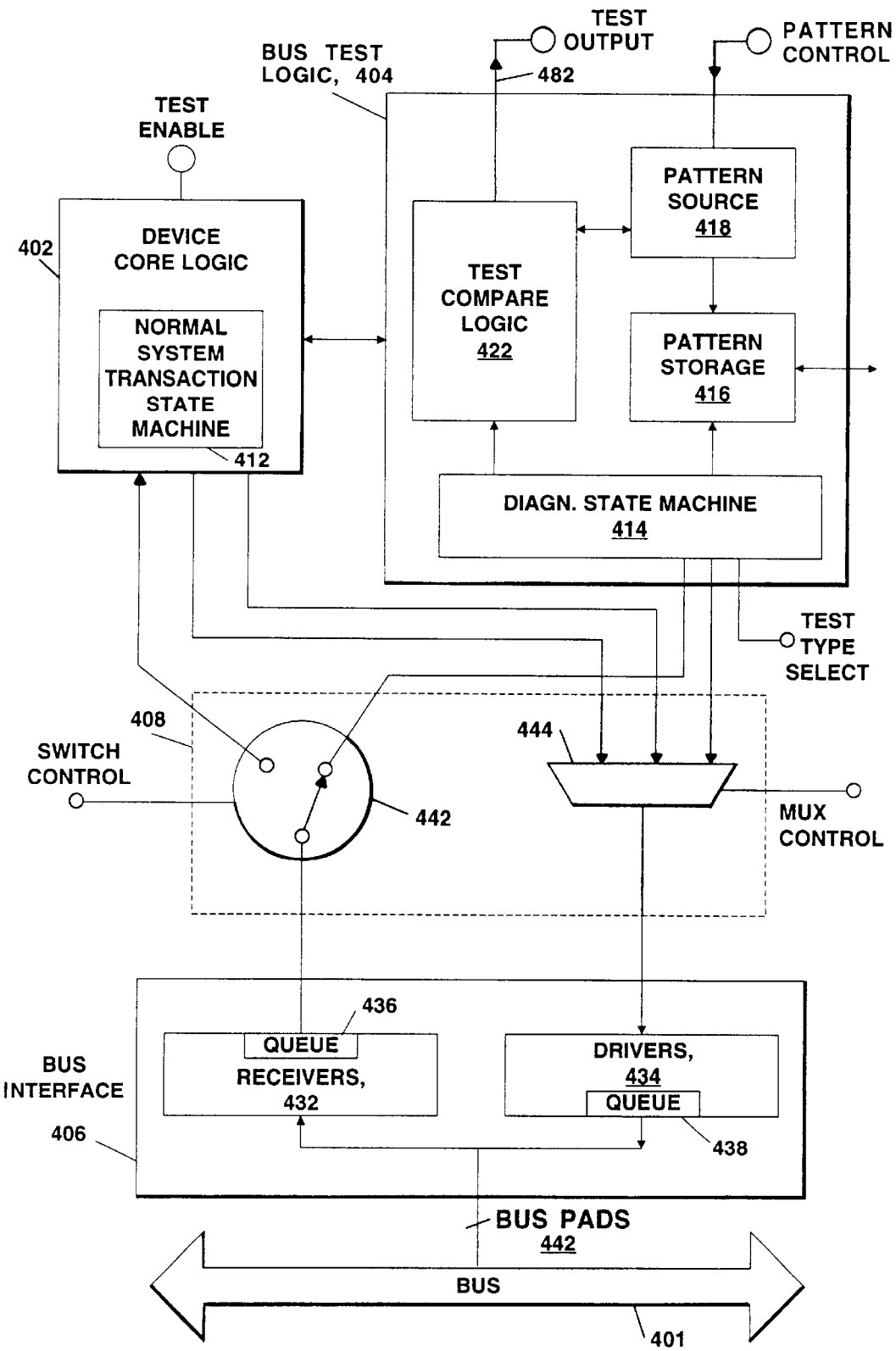
FIG. 4A is a block diagram of an exemplary one of the devices of FIG. 1 in accordance with an embodiment of the invention, which can implement both the unidirectional and loopback testing methodology of FIGS. 2A and 2B.

FIG. 4A shows an embodiment of a bus device 400, which can be used to implement either of the first or second devices 102, 104 of FIG. 1, and permit both unidirectional or loopback testing of bus 401. The bus device 400 includes device core logic 402, bus testing logic 404, a bus interface 406, and signal control circuitry 408. The device core logic 402 includes normal system transaction state machines 412, as described above. The bus testing logic 404 includes a diagnostic state machine 414 for providing the appropriate logic to conduct bus testing, a pattern storage module 416 for holding one or more patterns, including source patterns and/or received patterns, a pattern source 418 for providing patterns used for stimulus cycles, and test compare logic 422 for comparing source patterns with received patterns to identify errors. The pattern storage 416 can be a conventional memory device. The pattern source 418 can be (a) a link from the test console 314, a user input device, (b) an automated pattern generator that generates patterns, e.g., of pre-specified forms, or (c) a pattern selector that selects, e.g., responsive to a user input, one of a plurality of patterns preloaded into the pattern store 416. The test compare logic 422 is shown as separate from the diagnostic state machine 414, though it can also be implemented as part of the latter state machine.

The bus interface 406 includes a set of receivers 432 and a set of drivers 434. A transceiver comprising one of the receivers 432 and one of the drivers 434 can be provided for each bus line. Alternatively, where the bus 401 is implemented as a point-to-point switching fabric, e.g., in the form of a cross-bars switch, the bus interface 406 can be implemented with the appropriate transceiver implementation. The receivers 432 and drivers 434 can also have queues or buffers 436, 438 for congestion and flow control purposes. For example, queues 438 can hold driver output pending the device 400 gaining control of the bus 401 and then can apply the driver output onto bus pads 442 of the bus 401.

The signal control circuitry 408 includes a switch 442 for selectively providing signals from the receivers 432 either to the device core logic 402 for normal device functioning or to the bus test logic 404 for diagnostic testing purposes, responsive to a switch control signal. The signal flow control circuitry 418 also includes a multiplexer (MUX) 444 for selectively providing signals to the drivers 434 from either the device core logic 402 for normal device functioning or the bus test logic 404 for diagnostic testing purposes, responsive to a MUX control signal. In some implementations, the MUX control signal can be, for example, an arbitration signal from an arbiter indicating that the device 400 has gained control of the bus 401 for a particular purpose.

With these component parts, the device 400 is equipped to perform as either of the driver end 302 or receiver end 306 of FIG. 3. Moreover, the bus test logic 404 can perform as either or both of the diagnostic state machines 324, 336 of FIG. 3, and can perform analysis of test results.

As an alternative to the test compare logic 422 for analyzing the results of the test, the bus test logic 404 can apply a time sequence of bus signals on the bus that the test bit patterns represent, and the first failure (if any) induced in the receiving device by those bus signals can be identified, and attendant operating information captured, as described in the above-referenced patent application entitled "Method and Apparatus for Extracting First Failure and Attendant Operating Information From Computer System Devices". Thus, the test compare logic 422 can be regarded as optional in some applications of this aspect of the invention.

The compare logic 422 can be otherwise implemented in some applications of the invention. For example, the applied bus signals can cause an error correction code (ECC) error, and the bus test logic 404 can verify that the error was detected and properly corrected at the receiver. This approach can be used to introduce purposefully a bus error, such as an ECC or parity error, in order to assure that the first failure capture system or the error detection system implemented by the electronic device can properly detect the error.

Figure 4B:
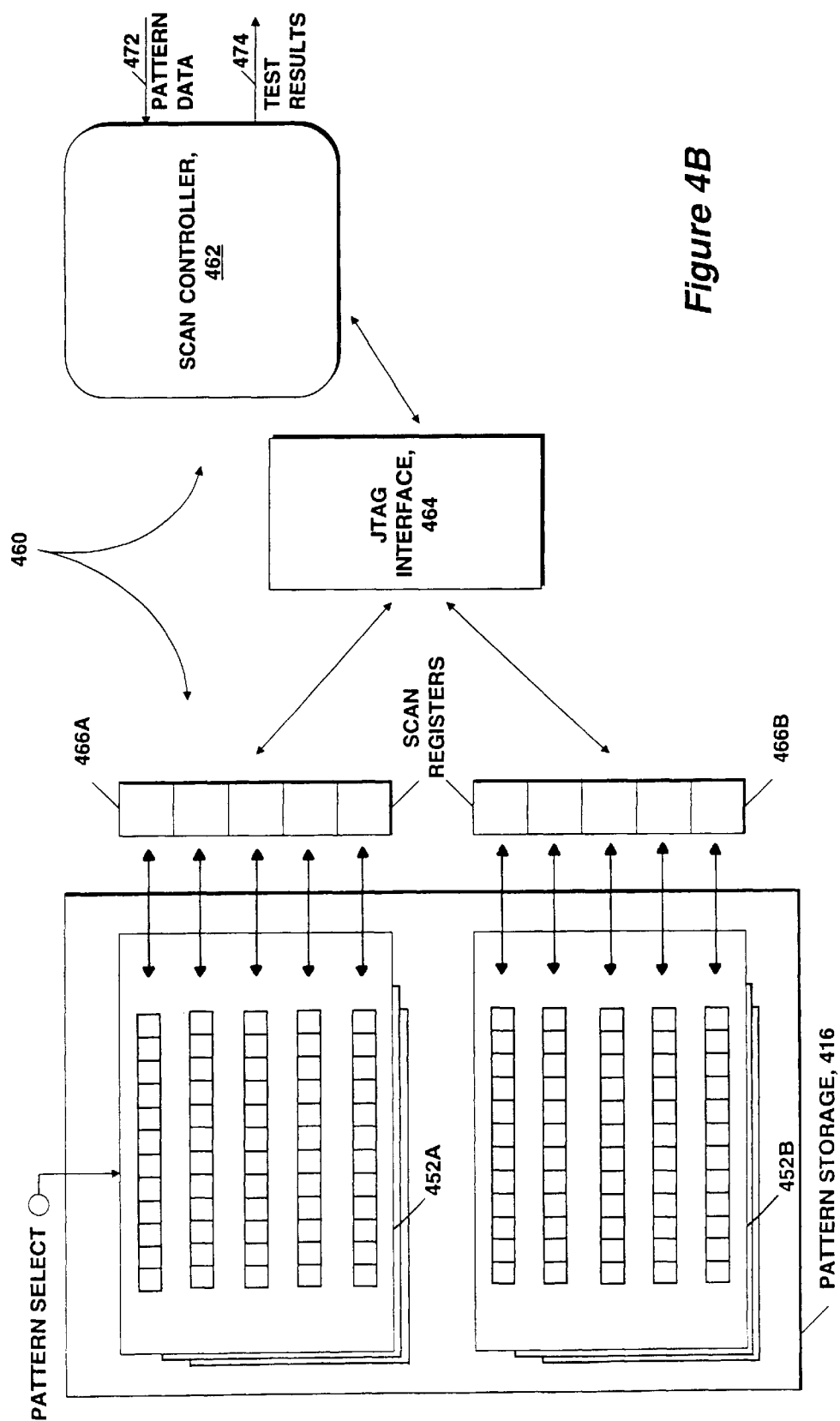
FIG. 4B is a block diagram of the pattern storage of FIG. 4A for holding a plurality of bit patterns, in combination with a JTAG interface and scan controller in accordance with an embodiment of the invention.

FIG. 4B shows an implementation of the pattern storage 416 of FIG. 4A. As illustrated, the pattern storage 416 can hold one or more patterns 452A, 452B. For example, it can hold a number of stimulus patterns or a number of stimulus and received patterns. A pattern select signal can be used to select the one of the stimulus patterns to be used in testing. FIG. 4B also shows a JTAG apparatus 460 for scanning patterns into and out of the pattern storage 416. The JTAG apparatus 460 includes a scan controller 462 for receiving data for a stimulus pattern on a pattern data input port 472, and applying them to the pattern storage 416 through a JTAG interface 464 and one or more scan registers 466A, 466B. Likewise, received patterns can be scanned from the patterns 452A, 452B into the scan registers 466A, 466B via the JTAG interface 464 and scan controller 462, and placed on a test results output port 474. The JTAG apparatus 460 preferable complies with the JTAG Spec, and provides for programmable control, e.g., computer-executable software control of loading and reading of pattern data.

Analysis of the test results can be effected by a separate service processor, as noted below. The service processor used for analysis of test results need not be a service-dedicated computer system. It can also be a general-purpose computer system, such as that used for general system administration, which should also receive the error notification signal so as to alert the system administrator, e.g., by a visual or audio display of an error alert. The error notification signal can be provided, e.g., from the test compare logic 422 over test output terminal 482.

Figure 5:
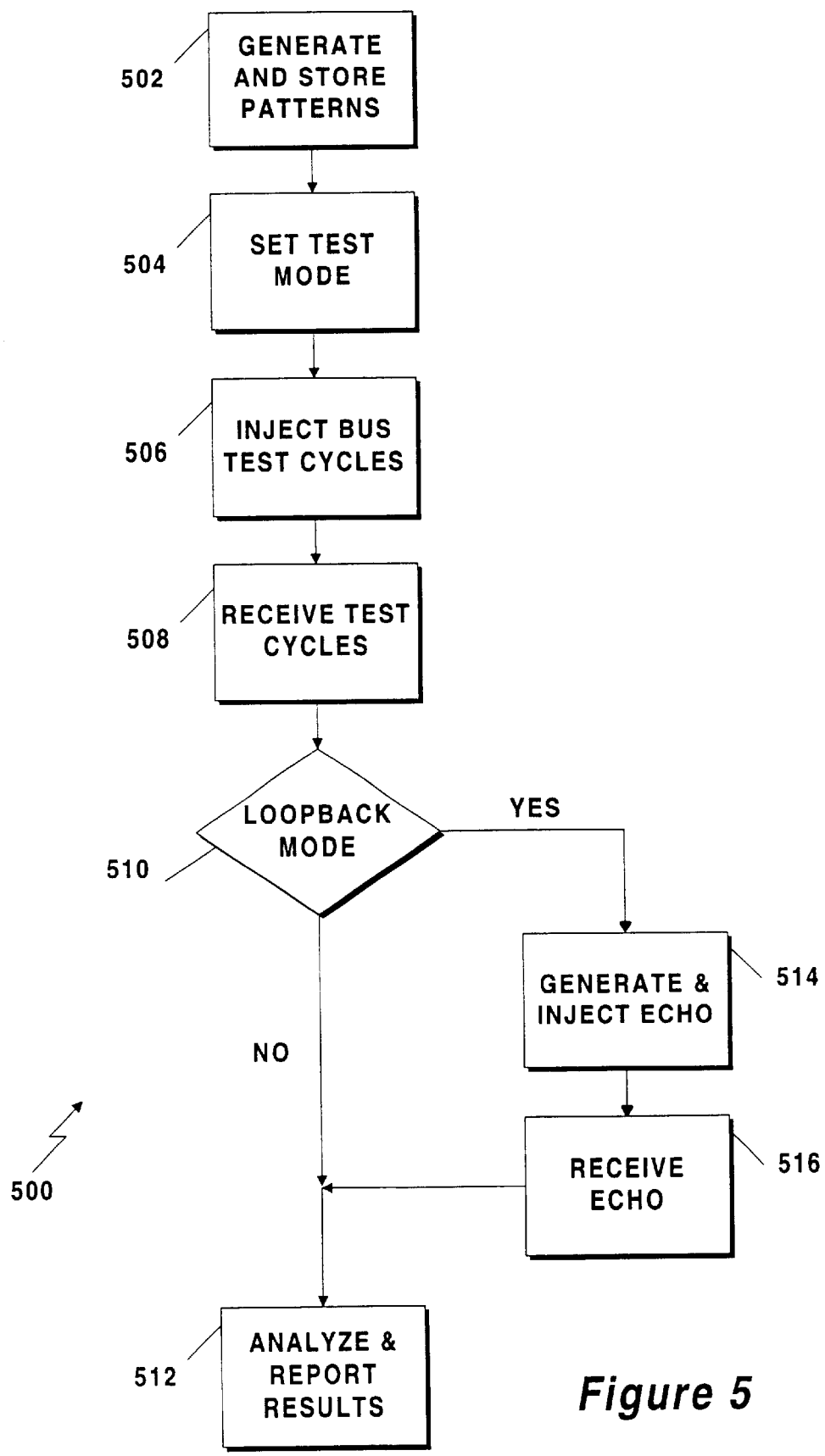
FIG. 5 is a flow chart of a method of bus testing using the apparatus of FIGS. 1–4B, in accordance with an embodiment of the invention.

FIG. 5 shows a method 500 of bus testing. The method 500 starts in block 502 with generating and storing stimulus patterns. Each test requires at least one pattern. In block 504, the method 500 sets the test mode, i.e., whether the test will be unidirectional or loopback. If more than one stimulus pattern is stored, then block 504 can also select the pattern that is to be used in the next test to be run. In block 506, the method 500 causes drivers to inject the stimulus cycles per the pattern onto the bus. In block 508, the method 500 causes receivers to receive the patterns from the bus, and store them for analysis or retransmission, depending on test methodology.

The method 500 determines, in block 510, whether the diagnostic test entails a loopback methodology. If not, then the test is unidirectional, and method 500 next, in block 512, analyzes the received pattern and reports the results. If a loopback test, the method 500 next, in block 514, generates and injects an echo replica of the received pattern, and, in block 516, causes a receiver in the same device that originally sent the stimulus pattern to receive the echo. Afterwards, method 500 directs the echo to block 512 for analysis and reporting, as described above.

Figure 6:
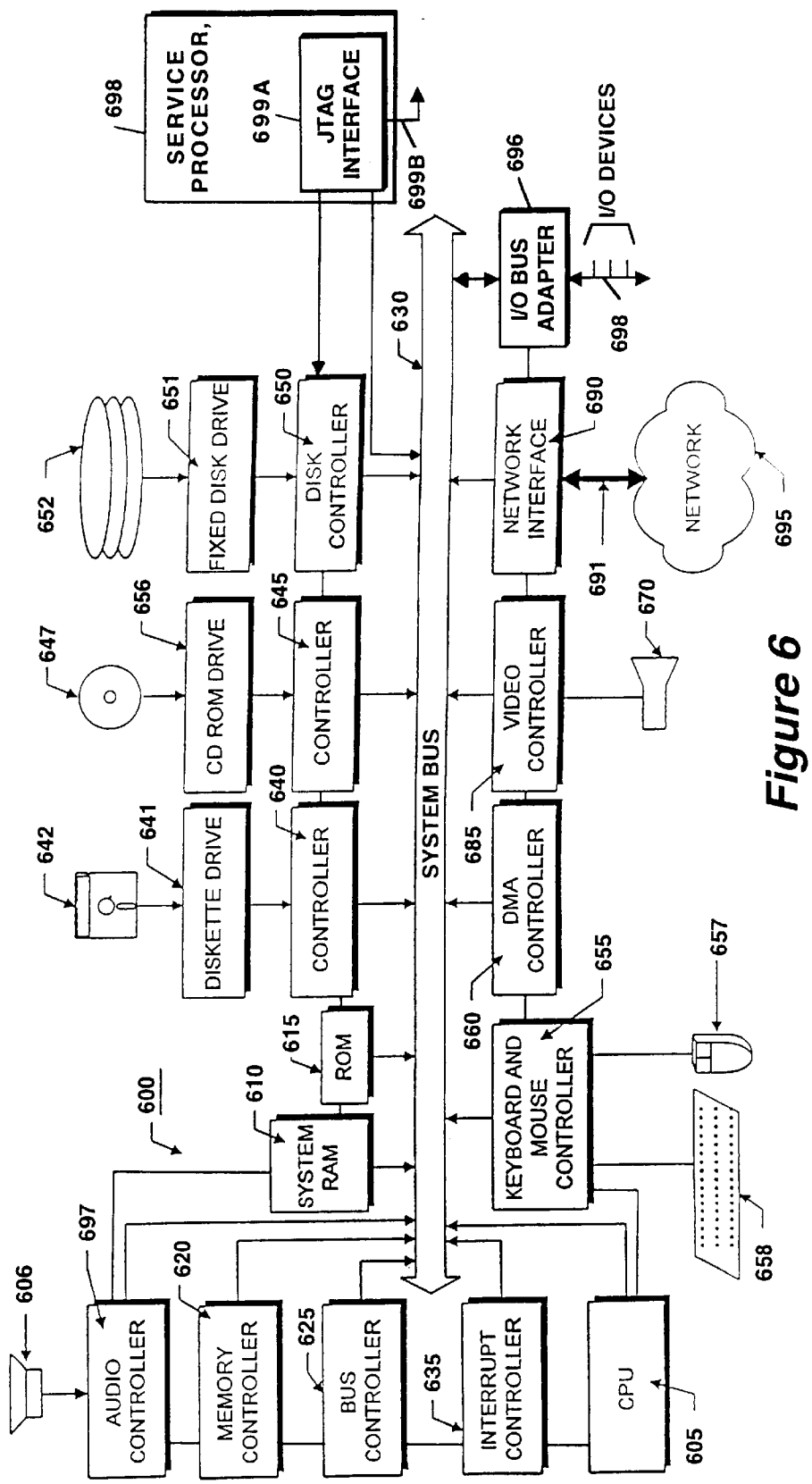
FIG. 6 is a a block diagram of an illustrative embodiment of a computer system in which the invention can be practiced.
Figure 7:
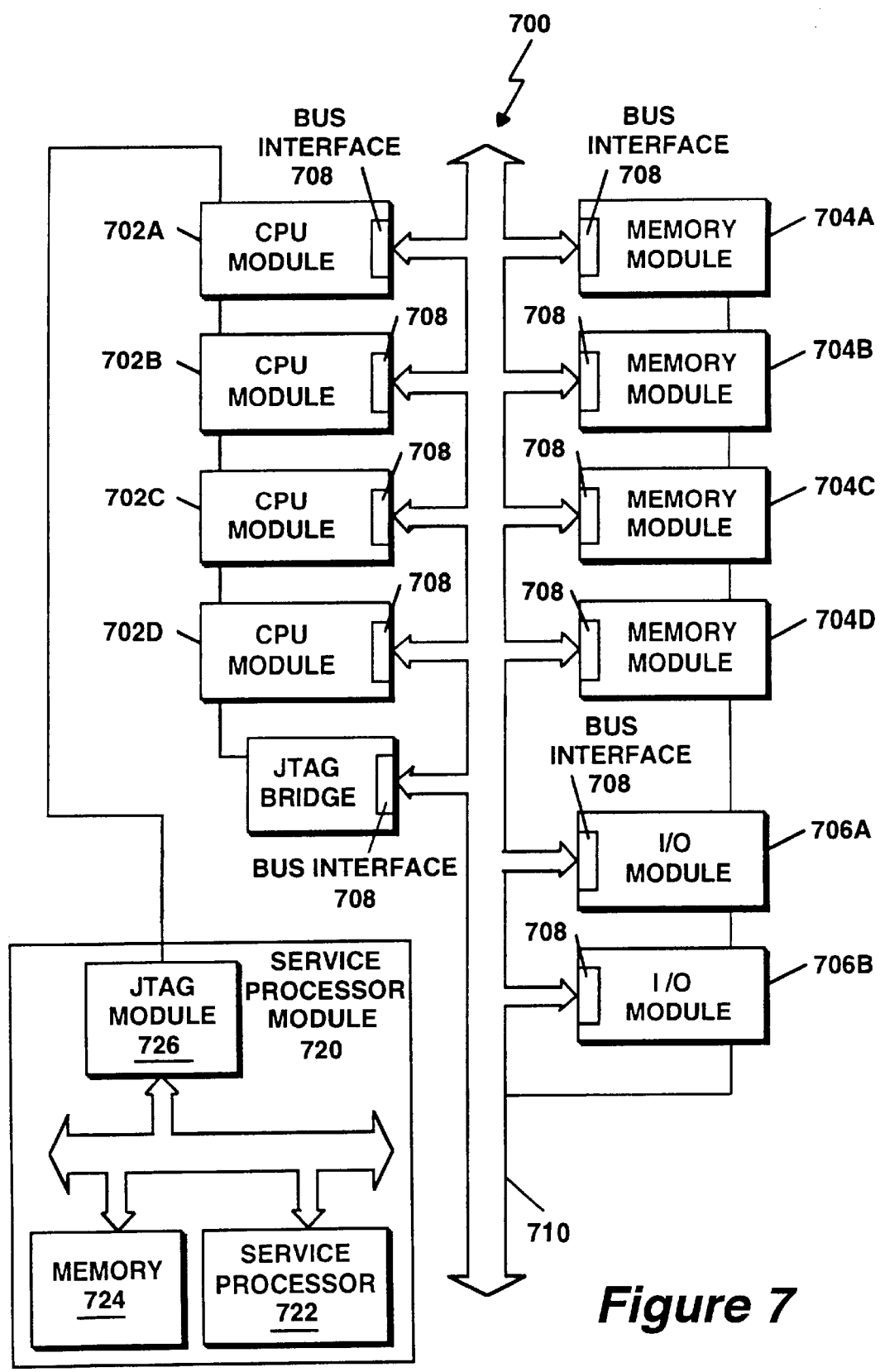
FIG. 7 is a block diagram of an illustrative embodiment of a multiprocessor computer system in which the invention can be practiced.

FIG. 6 shows a computer system 600, in which the invention can be practiced. It should be understood at the outset that the invention when embodied as a computer system can be implemented in any of a great variety of computer architectures, including both single-processor designs such as that shown in FIG. 6 and multiprocessor designs such as that shown in FIG. 7. In addition, the invention can be practiced in other forms of intelligent devices, in which the invention can be advantageously employed. Such other intelligent devices may include network devices, such as bridges and gateways, and communication devices, to name a few. Moreover, the single-processor computer system shown in FIG. 6 and the multiprocessor computer system shown in FIG. 7 are discussed only for illustrative purposes, and their specific layout and design should not be considered a limitation of the invention. Although the description below may refer to terms commonly used in describing particular computer systems, the described concepts apply equally to other computer systems, including systems having architectures that are dissimilar to that shown in FIGS. 6 and 7.

In FIG. 6, the computer system 600 includes a central processing unit (CPU) 605, which may include a conventional microprocessor, random access memory (RAM) 610 for temporary storage of information, and read only memory (ROM) 615 for permanent storage of information. A memory controller 620 is provided for controlling system RAM 610. A bus controller 625 is provided for controlling system bus 630, and an interrupt controller 635 is used for receiving and processing various interrupt signals from the other system components.

Mass storage may be provided by diskette 642, CD-ROM 647, or hard disk 652. Data and software may be exchanged with computer system 600 via removable media, such as diskette 642 and CD-ROM 647. Diskette 642 is insertable into diskette drive 641, which is connected to system bus 630 by controller 640. Similarly, CD-ROM 647 is insertable into CD-ROM drive 646, which is connected to system bus 630 by controller 645. Finally, the hard disk 652 is part of a fixed disk drive 651, which is connected to system bus 630 by controller 650.

User input to and output from the computer system 600 may be provided by a number of devices collectively constituting an I/O subsystem. For example, a keyboard 656 and a mouse 657 may be connected to a system bus 630 by keyboard and mouse controller 655. An audio transducer 696, which may act as both a microphone and a speaker, is connected to bus 630 by audio controller 697. It should be obvious to those it reasonably skilled in the art that other input devices, such as a pen and/or tablet and a microphone for voice input, may be connected to computer system 600 through bus 630 and an appropriate controller. DMA controller 660 is provided for performing direct memory access to system RAM 610. A visual display is generated by a video controller 665, which controls video display 670. Where the computer system 600 is a server, the foregoing I/O devices may be part of the system only when needed for system monitoring, upgrading or servicing.

Computer system 600 also includes a network adapter 690 that allows the computer system 600 to be interconnected to a network 695 via a bus 691. The network 695, which may be a local area network (LAN), a wide area network (WAN), or the Internet, may utilize general-purpose communication lines that interconnect multiple network devices.

Moreover, the computer system 600 can include an I/O bus adapter 696 connected between the system bus 630 and an I/O bus 697 for communication between components connected to the system bus and one or more I/O devices connected to the I/O bus. The I/O bus adapter 696 typically is a node on each of the buses 630, 697, and serves to convert signals on one of the buses intended for devices on the other into signals having the appropriate protocol and addressing for their destination.

The system bus 630, network bus 691, and I/O bus 697 are collectively referred to herein for convenience as the "computer buses", a term intended to a encompass not just these named buses, but also any and all buses implementable in a computer system, including switched network interconnects. The computer buses can each include address, control, and data lines for communication via the particular bus protocols with which each complies. Each, of the devices that is connected to any of the computer buses includes a bus interface (not separately shown in this figure) for driving and receiving signals over the bus in accordance with its bus protocol. Additionally, the computer system 600 can include a service processor 698. The service processor 698 has a JTAG interface 699A, which communicates over a dedicated JTAG link 699B with other devices connected thereto. Additionally, the computer system 600 can include a service processor 698. The service processor 698 has a JTAG interface 699A, which communicates over a dedicated JTAG link 699B with other devices connected thereto.

Computer system 600 generally is controlled and coordinated by operating system software, such as the SOLARIS™ operating system (available from Sun Microsystems, Palo Alto, Calif., USA). Among other computer system control functions, the operating system controls allocation of system resources and performs tasks such as process scheduling, memory management, networking and I/O services.

In FIG. 7, the multiprocessor computer system 700 is shown as including four CPU modules 702A–D, four memory modules 704A–D, and two I/O modules 706A–B. The exact number of each of these devices is used merely for purposes of illustration and other computer system implementations may include a greater or lesser number of these devices. Each of the modules 702A–D, 704A–D, and 706A–B includes a bus interface 708 for connecting their respective module to a system bus 710. The system bus 710 can be, for example, implemented as a network containing a point-to-point switching fabric. The interfaces 708 contain logic for driving and receiving signals over the system bus 710 in accordance with its bus protocol, preferably implemented as an integrated circuit (IC). Moreover, each module 702A–D, 704A–D, and 706A–B can be implemented as a separate application specific integrated circuit ("ASIC") containing the interface 708.

FIG. 7 also shows a service processor module 720 for managing service-related activities for the computer system 700. The service processor module 720 includes a service processor 722 for executing programs, such as software, a memory 724 for storing data and programs, and a JTAG module 726, which can implement the JTAG interfaces 706, for example, under the control of the service processor 722. The service processor module 720 can be implemented as a computer system, having the components discussed above in conjunction with FIG. 6.

A software implementation of components of the above-described embodiment may comprise computer instructions and routines either fixed on a tangible medium, such as a computer-readable media, e.g. the diskette 642, CD-ROM 647, ROM 615, or fixed disk 652 of FIG. 6, or transmittable via a modem or other interface device, such as communications adapter 690 connected to the network 695 over a medium 691. Medium 691 can be either a tangible medium, including but not limited to optical or hard-wire communications lines, or may be implemented with wireless techniques, including but not limited to microwave, infrared or other transmission techniques. It may also be the Internet. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Though an exemplary embodiment of the invention has been disclosed, it will be apparent to those skilled in the art that various changes and modifications can be made that will achieve some or all of the advantages of the invention without departing from the spirit and scope of the invention. Moreover, it will be obvious to those reasonably skilled in the art that other components performing the same functions may be suitably substituted. Furthermore, aspects of the invention may be achieved in either all software implementations, using the appropriate processor instructions, or in hybrid implementations that utilize a combination of hardware logic, firmware logic, and/or software logic to achieve the same results. Further, aspects such as the size of memory, the specific configuration of logic and/or instructions utilized to achieve a particular function, as well as other modifications to the disclosed embodiments and the inventive concept are intended to be covered by the appended claims.

What is claimed is:

1. Apparatus for testing a bus in an electronic device, the apparatus comprising:
   a test storage which holds a predetermined test bit pattern that represents a time sequence of bus signals;
   a bus driver which responds to the predetermined test bit pattern by generating a time sequence of bus signals on the bus that the test bit pattern represents;
   a bus receiver which receives the time sequence of bus signals from the bus after the bus signals have traversed the bus, and generates a received bit pattern from the received bus signals, the received bit pattern representing a time sequence of received bus signals; and
   a comparator which compares the test bit pattern to the received bit pattern and detects discrepancies indicating bus errors.

2. The apparatus in accordance with claim 1, wherein the bus comprises a plurality of bus lines and wherein the test bit pattern comprises portions that represent a time sequence of bus signals for each of the plurality of bus lines.

3. The apparatus in accordance with claim 1 further comprising a result storage for storing the received bit pattern.

4. The apparatus in accordance with claim 1, wherein the time sequence comprises a plurality of time cells and wherein the test bit pattern includes a plurality of bits, each corresponding to a drive voltage for the bus for each of the plurality of time cells.

5. The apparatus in accordance with claim 1, further comprising test logic which directly controls the bus driver and bus receiver.

6. The apparatus in accordance with claim 1, further comprising a second bus receiver connected to the bus at a location of the bus driver.

7. The apparatus in accordance with claim 6, wherein the bus receiver includes a second bus driver which responds to the received bit pattern by generating a time sequence of second bus signals on the bus that the received bit pattern represents, which second bus signals propagate back to the second bus receiver.

8. The apparatus in accordance with claim 7 wherein the second bus receiver receives the second bus signals after they have traversed the bus, and resolves the second bus signals into a second received bit pattern and the comparator compares the test bit pattern to the second received bit pattern and indicates any discrepancy.

9. The apparatus in accordance with claim 1 wherein the test bit pattern is selected to generate a time sequence of bus signals which produces a predetermined bus utilization.

10. Apparatus for use in a computer system having a first resource, a second resource and a bus connecting the first and second resources, a bus driver for generating bus signals on the bus and a bus receiver for receiving the bus signals after they have traversed the bus and for generating a received bit pattern from the received bus signals, the received bit pattern representing a time sequence of received bus signals, the apparatus for testing the bus, comprising:
    a test storage which holds a predetermined test bit pattern that represents a time sequence of bus signals;
    test logic which responds to the predetermined test pattern by controlling the bus driver to generate a time sequence of bus signals on the bus that the test bit pattern represents; and
    a comparator which compares the test bit pattern to a received bit pattern generated by the bus receiver in response to the time sequence of bus signals on the bus, the comparator detecting discrepancies indicating bus errors.

11. The apparatus in accordance with claim 10, wherein the bus comprises a plurality of bus lines and wherein the test bit pattern comprises portions that represent a time sequence of bus signals for each of the plurality of bus lines.

12. The apparatus in accordance with claim 10 further comprising a result storage and wherein the test logic controls the bus receiver to store the received bit pattern in the result storage.

13. The apparatus in accordance with claim 10, further comprising a second bus receiver connected to the bus at a location of the bus driver.

14. The apparatus in accordance with claim 13, further comprising a second bus driver which responds to the received bit pattern by generating a time sequence of second bus signals on the bus that the received bit pattern represents, which second bus signals propagate back to the second bus receiver.

15. The apparatus in accordance with claim 14, wherein the second bus receiver receives the second bus signals after they have traversed the bus, and resolves the second bus signals into a second received bit pattern and the test logic controls the comparator to indicate any discrepancy between the test bit pattern and the second received bit pattern.

16. The apparatus in accordance with claim 10 wherein the computer system further comprises an operating system which controls the bus driver to generate operating bus signals on the bus in order to transfer information from the first resource to the second resource and wherein the test logic controls the bus driver to generate the time sequence of bus signals on the bus, which time sequence bus signals are interleaved with the operating bus signals.

17. The apparatus in accordance with claim 16 wherein the test logic arbitrates with the operating system for control of the bus in order to generate the time sequence of bus signals on the bus.

18. The apparatus in accordance with claim 10 wherein the test bit pattern is selected to generate a time sequence of bussignals which produces a predetermined bus utilization.

19. A method for testing a bus in a computer system, the method comprising:
   (a) storing a predetermined test bit pattern that represents a time sequence of bus signals;
   (b) generating a time sequence of bus signals on the bus that the test bit pattern represents;
   (c) receiving the time sequence of bus signals from the bus after the bus signals have traversed the bus, and generating a received bit pattern from the received bus signals, the received bit pattern representing a time sequence of received bus signals; and
   (d) comparing the test bit pattern to the received bit pattern and detecting discrepancies indicating bus errors.

20. The method in accordance with claim 19, wherein the bus comprises a plurality of bus lines and wherein the test bit pattern comprises portions that represent a time sequence of bus signals for each of the plurality of bus lines.

21. The method in accordance with claim 19 further comprising:
   (e) repeating the generating step at a programmable rate to control bus saturation.

22. The method in accordance with claim 19, wherein the time sequence comprises a plurality of time cells and wherein the test bit pattern includes a plurality of bits, each corresponding to a drive voltage for the bus for each of the plurality of time cells.

23. The method in accordance with claim 19, further comprising:
   (f) directly controlling the bus driver and bus receiver with test logic.

24. The method in accordance with claim 19, further comprising:
   (g) connecting a second bus receiver to the bus at a location of the bus driver.

25. The method in accordance with claim 24, further comprising:
   (h) generating a time sequence of second bus signals on the bus that the received bit pattern represents, which second bus signals propagate back to the second bus receiver.

26. The method in accordance with claim 25, further comprising:
   (i) using the second bus receiver to receive the second bus signals after they have traversed the bus, and to resolve the second bus signals into a second received bit pattern; and
   (j) comparing the test bit pattern and the second received bit pattern and indicating any discrepancy.

27. The method in accordance with claim 19 wherein the test bit pattern is selected to generate a time sequence of bus signals which produces a predetermined bus utilization.

28. The method in accordance with claim 19 wherein the computer system further comprises an operating system which controls the bus driver to generate operating bus signals on the bus in order to transfer information from the first resource to the second resource and wherein step (b) comprises:
   (b1) generating the time sequence of bus signals on the bus interleaved with the operating bus signals.

29. The method in accordance with claim 28 wherein step (b1) comprises arbitrating with the operating system for control of the bus in order to generate the time sequence of bus signals on the bus.

30. The method in accordance with claim 29, wherein the arbitrating step causes interleaving of test and normal cycles.

31. The method in accordance with claim 19 further comprising comparing the test bit pattern and the received bit pattern and indicating any discrepancy.

32. The method in accordance with claim 19 further comprising, including in the test bit pattern an erroneous parity error; and determining, from the test bit pattern and the received bit pattern, whether the computer system can detect the erroneous parity error.

* * * * *